United States Patent
Hirosawa et al.

(10) Patent No.: US 8,902,390 B2
(45) Date of Patent: Dec. 2, 2014

(54) LIQUID CRYSTAL DISPLAY DEVICE HAVING A CROSS-SHAPED PIXEL ELECTRODE

(75) Inventors: Jin Hirosawa, Saitama (JP); Arihiro Takeda, Saitama (JP)

(73) Assignee: Japan Display Inc., Tokyo (JP)

( * ) Notice: Subject to any disclaimer, the term of this patent is extended or adjusted under 35 U.S.C. 154(b) by 334 days.

(21) Appl. No.: 13/405,799

(22) Filed: Feb. 27, 2012

(65) Prior Publication Data

US 2013/0010235 A1    Jan. 10, 2013

(30) Foreign Application Priority Data

Jul. 8, 2011    (JP) .................. 2011-152103

(51) Int. Cl.
| | | |
|---|---|---|
| G02F 1/1337 | (2006.01) | |
| G02F 1/1343 | (2006.01) | |
| G02F 1/1335 | (2006.01) | |
| G02F 1/1362 | (2006.01) | |

(52) U.S. Cl.
CPC ............ *G02F 1/134309* (2013.01); *G02F 2001/134381* (2013.01); *G02F 2001/136218* (2013.01); *G02F 1/13378* (2013.01); *G02F 2001/134318* (2013.01)
USPC .............. 349/141; 349/39; 349/96; 349/132; 349/139

(58) Field of Classification Search
USPC .................. 349/39, 96, 132, 139, 144
See application file for complete search history.

(56) References Cited

U.S. PATENT DOCUMENTS

| | | |
|---|---|---|
| 6,266,116 B1 | 7/2001 | Ohta et al. |
| 7,495,724 B2 | 2/2009 | Yoshida et al. |
| 7,742,135 B2 | 6/2010 | Tago et al. |
| 7,834,833 B2 | 11/2010 | Takei |
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2007/0200990 A1 | 8/2007 | Hirosawa et al. |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/339,915, filed Dec. 29, 2011, Takano, et al.

(Continued)

*Primary Examiner* — Huyen Ngo
(74) *Attorney, Agent, or Firm* — Oblon, Spivak, McClelland, Maier & Neustadt, L.L.P.

(57) ABSTRACT

According to one embodiment, a liquid crystal display device includes a first substrate including a cross-shaped pixel electrode which includes a main pixel electrode and a sub-pixel electrode, and a second substrate including a common electrode which includes main common electrodes and sub-common electrodes. A first horizontal inter-electrode distance between the main pixel electrode and the main common electrode is less than a second horizontal inter-electrode distance between the sub-pixel electrode and the sub-common electrode and is greater than a vertical inter-electrode distance between the main pixel electrode and the main common electrode.

13 Claims, 8 Drawing Sheets

(56) References Cited

U.S. PATENT DOCUMENTS

| | | |
|---|---|---|
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0192160 A1 | 8/2008 | Yoshida et al. |
| 2009/0147201 A1 | 6/2009 | Yoshida et al. |
| 2009/0207363 A1 | 8/2009 | Hirosawa |
| 2011/0075083 A1 | 3/2011 | Takeda et al. |
| 2011/0234947 A1 | 9/2011 | Hirosawa |
| 2012/0019755 A1 | 1/2012 | Tokuoka et al. |
| 2012/0099070 A1 | 4/2012 | Hirosawa et al. |
| 2013/0033661 A1* | 2/2013 | Kozuka et al. .................. 349/96 |
| 2013/0038823 A1* | 2/2013 | Takeda et al. .................. 349/99 |
| 2013/0093983 A1* | 4/2013 | Kizu et al. ...................... 349/96 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2000-81641 | 3/2000 |
| JP | 2000-98405 | 4/2000 |
| JP | 2005-3802 | 1/2005 |
| JP | 3644653 | 2/2005 |
| JP | 2005-242307 | 9/2005 |
| JP | 2009-192822 | 8/2009 |

OTHER PUBLICATIONS

U.S. Appl. No. 13/348,906, filed Jan. 12, 2012, Morita, et al.
U.S. Appl. No. 13/350,337, filed Jan. 13, 2012, Fukuoka, et al.
U.S. Appl. No. 13/369,057, filed Feb. 8, 2012, Hirosawa.
Office Action issued May 7, 2013, in Japanese Patent Application No. 2011-152103 (with English-language translation).
U.S. Appl. No. 13/542,049, filed Jul. 5, 2012, Takeda, et al.
U.S. Appl. No. 13/562,647, filed Jul. 31, 2012, Takeda, et al.
U.S. Appl. No. 13/469,458, filed May 11, 2012, Takeda, et al.
U.S. Appl. No. 13/470,578, filed May 14, 2012, Takeda, et al.

\* cited by examiner

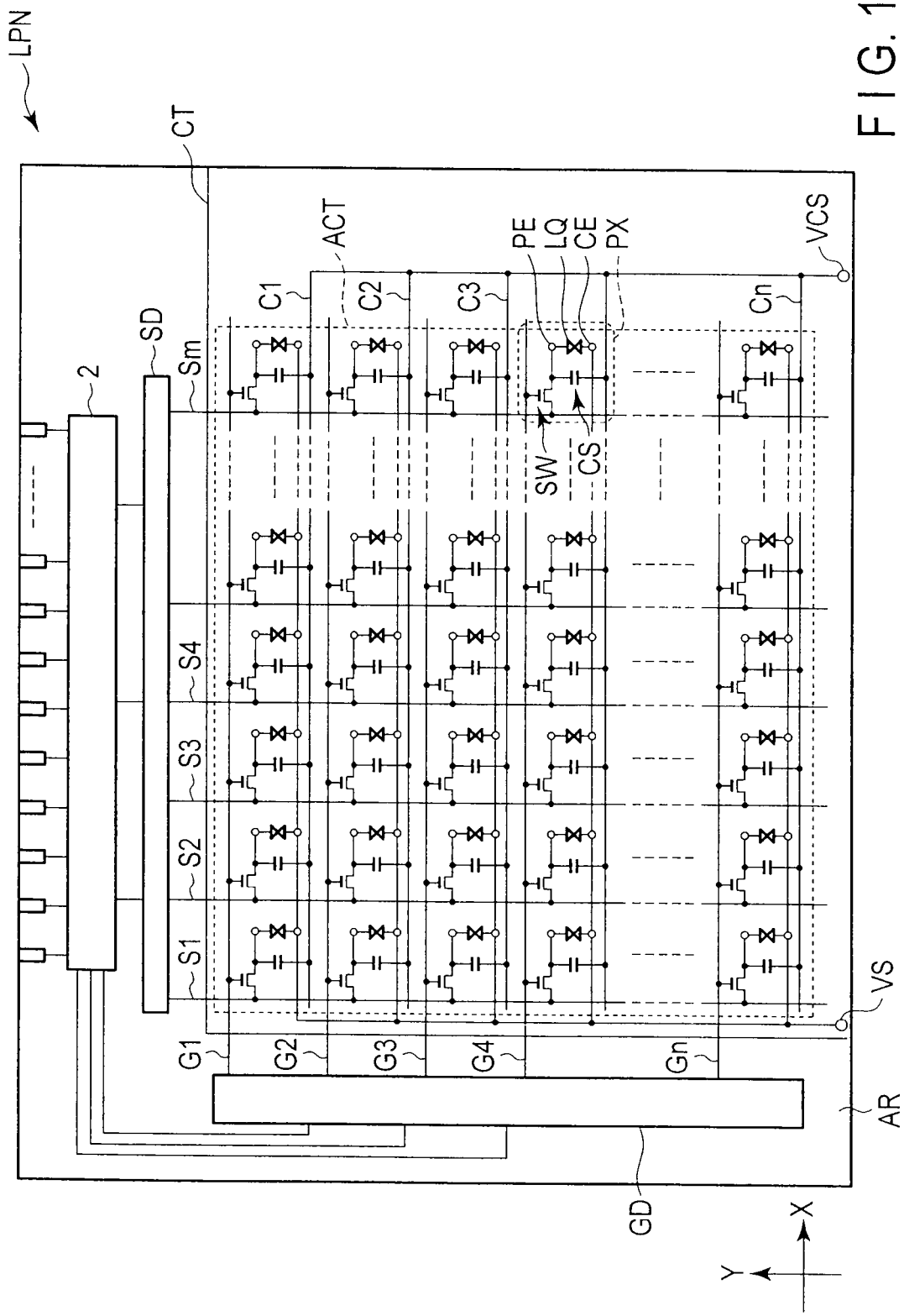
F I G. 1

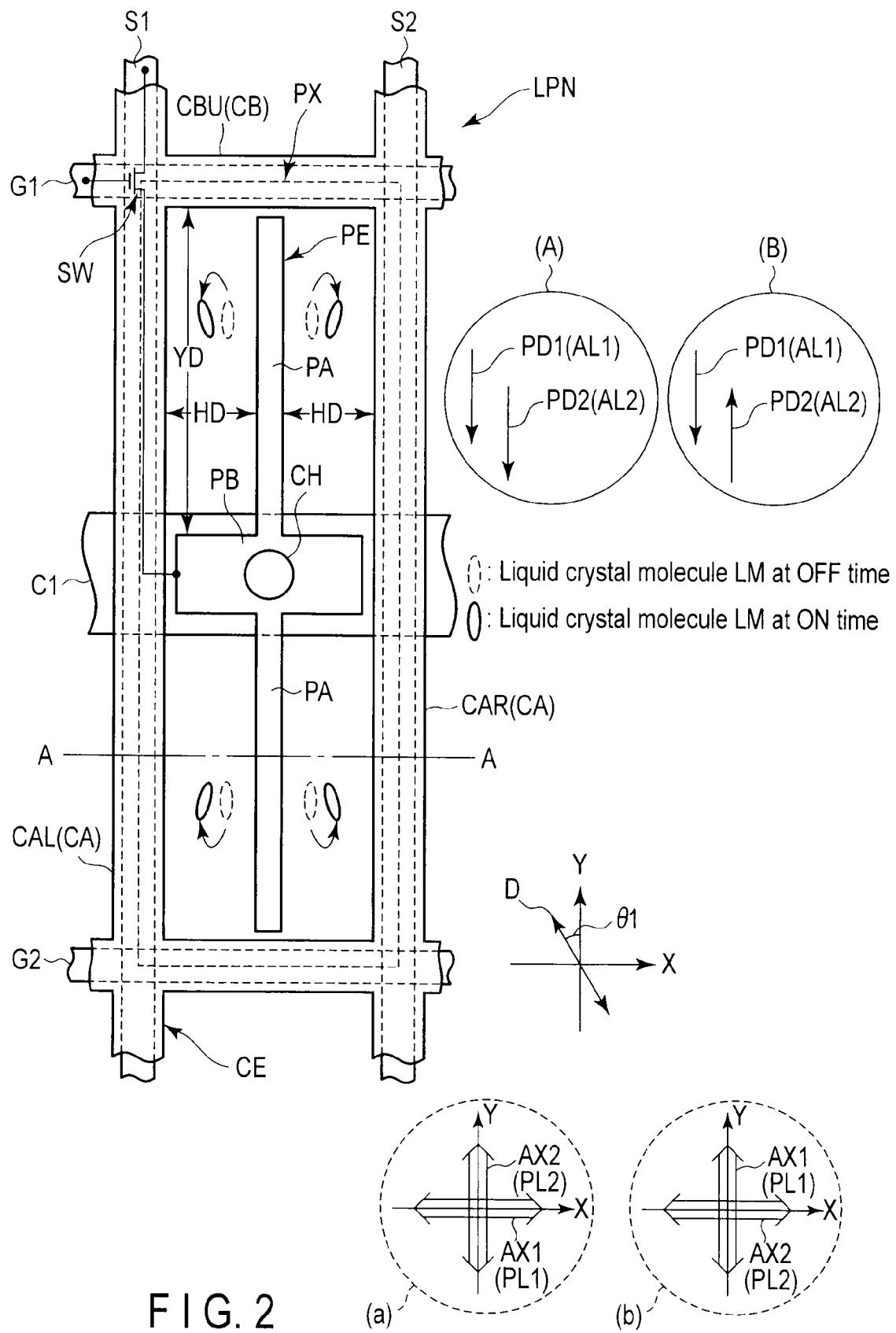
F I G. 2

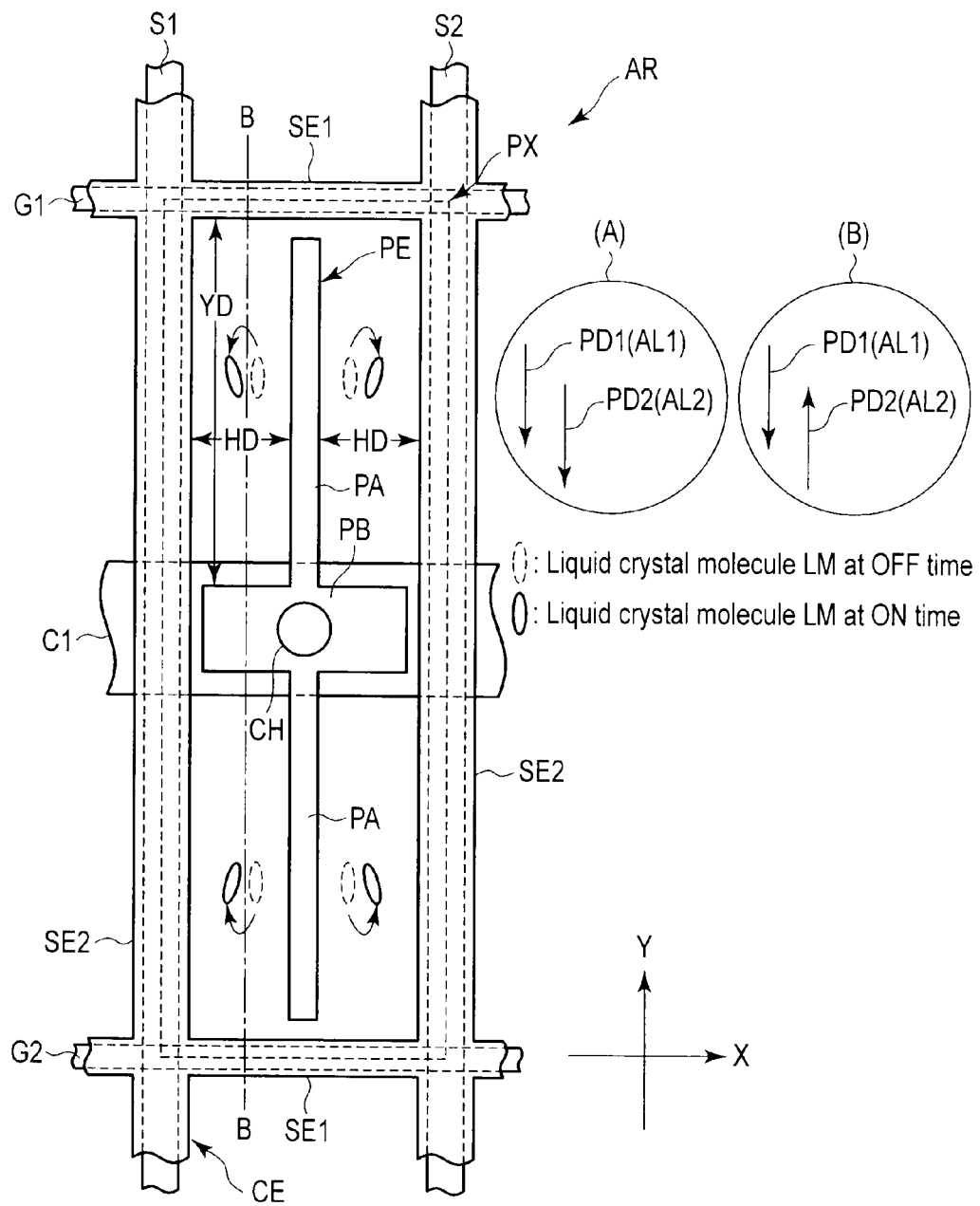
F I G. 7

LIQUID CRYSTAL DISPLAY DEVICE HAVING A CROSS-SHAPED PIXEL ELECTRODE

CROSS-REFERENCE TO RELATED APPLICATIONS

This application is based upon and claims the benefit of priority from prior Japanese Patent Application No. 2011-152103, filed Jul. 8, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 1 is a view which schematically illustrates a structure and an equivalent circuit of a liquid crystal display panel according to an embodiment.

FIG. 2 is a plan view which schematically shows a structure example of a pixel at a time when a liquid crystal display panel shown in FIG. 1 is viewed from a counter-substrate side.

FIG. 7 is a plan view which schematically shows another structure example of the pixel at a time when the liquid crystal display panel shown in FIG. 1 is viewed from the counter-substrate side.

DETAILED DESCRIPTION

Figure 3:
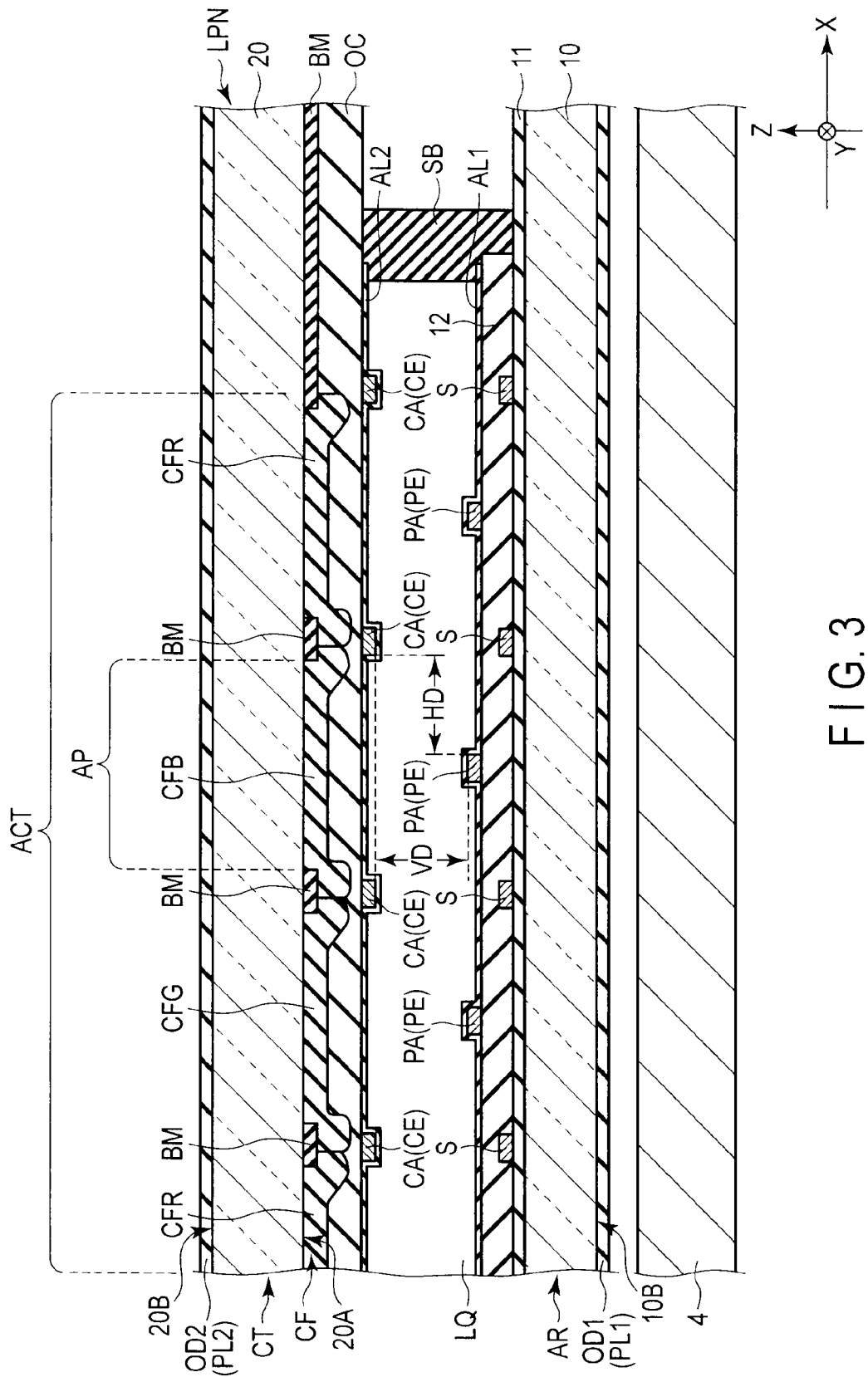
FIG. 3 is a schematic cross-sectional view, taken along line A-A in FIG. 2, showing a cross-sectional structure of the liquid crystal display panel shown in FIG. 2.

In general, according to one embodiment, a liquid crystal display device includes a first substrate including a cross-shaped pixel electrode which is disposed in a pixel having a less length in a first direction than in a second direction crossing the first direction and includes a main pixel electrode extending in the second direction and a sub-pixel electrode extending in the first direction, the first substrate further including a first alignment film which covers the pixel electrode and is subjected to alignment treatment in a first alignment treatment direction; a second substrate including a common electrode which includes main common electrodes extending in the second direction on both sides of the main pixel electrode and sub-common electrodes extending in the first direction on both sides of the sub-pixel electrode, the second substrate further including a second alignment film which covers the common electrode and is subjected to alignment treatment in a second alignment treatment direction which is parallel to the first alignment treatment direction; and a liquid crystal layer including liquid crystal molecules held between the first substrate and the second substrate, wherein a first horizontal inter-electrode distance in the first direction between the main pixel electrode and the main common electrode is less than a second horizontal inter-electrode distance in the second direction between the sub-pixel electrode and the sub-common electrode and is greater than a vertical inter-electrode distance between the main pixel electrode and the main common electrode in a third direction which is perpendicular to the first direction and the second direction.

According to another embodiment, a liquid crystal display device includes a first substrate including a first gate line and a second gate line which extend in a first direction, a first source line and a second source line which extend in a second direction crossing the first direction, a pixel electrode which includes a main pixel electrode extending in the second direction between the first source line and the second source line and a sub-pixel electrode extending the first direction between the first gate line and the second gate line, first shield electrodes which extend in the first direction and are opposed to the first gate line and the second gate line, and a first alignment film which covers the pixel electrode and the first shield electrodes and is subjected to alignment treatment in a first alignment treatment direction; a second substrate including a common electrode including main common electrodes which are opposed to the first source line and the second source line and extend in the second direction, and sub-common electrodes which are opposed to the first shield electrodes and extend in the first direction, the second substrate further including a second alignment film which covers the common electrode and is subjected to alignment treatment in a second alignment treatment direction which is parallel to the first alignment treatment direction; and a liquid crystal layer including liquid crystal molecules held between the first substrate and the second substrate, wherein a first horizontal inter-electrode distance in the first direction between the main pixel electrode and the main common electrode is less than a second horizontal inter-electrode distance in the second direction between the sub-pixel electrode and each of the first shield electrode and the sub-common electrode, and is greater than a vertical inter-electrode distance between the main pixel electrode and the main common electrode in a third direction which is perpendicular to the first direction and the second direction.

According to another embodiment, a liquid crystal display device includes a first substrate including a cross-shaped pixel electrode which includes a sub-pixel electrode extending a first direction and a main pixel electrode extending in a second direction crossing the first direction, the main pixel electrode having a greater length than the sub-pixel electrode, the first substrate further including a first alignment film which covers the pixel electrode and is subjected to alignment treatment in a first alignment treatment direction; a second substrate including a common electrode which includes main common electrodes extending in the second direction on both sides of the main pixel electrode and sub-common electrodes extending in the first direction on both sides of the sub-pixel electrode, the second substrate further including a second alignment film which covers the common electrode and is subjected to alignment treatment in a second alignment treatment direction which is parallel and identical to the first alignment treatment direction; and a liquid crystal layer including liquid crystal molecules held between the first substrate and the second substrate, wherein an initial alignment direction of the liquid crystal molecules in a state, in which an electric field is not produced between the pixel electrode and the common electrode, is substantially parallel to a direction of extension of the main pixel electrode, and a first horizontal inter-electrode distance in the first direction between the main pixel electrode and the main common electrode is less than a second horizontal inter-electrode distance in the second direction between the sub-pixel electrode and the sub-common electrode and is greater than a vertical inter-electrode distance between the main pixel electrode and the main common electrode in a third direction which is perpendicular to the first direction and the second direction.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend substantially linearly, for example, in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The lines S extend substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

A gate line G1, a gate line G2 and a storage capacitance line C1 extend in the first direction X. A source line S1 and a source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The length of the pixel PX in the second direction Y is about three times greater than the length of the pixel PX in the first direction X. The pixel electrode PE is disposed between the source line S1 and source line S2 which neighbor each other. In addition, the pixel electrode PE is located between the gate line C1 and gate line G2.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX.

A switching element SW in the illustrated example is electrically connected to the gate line G1 and source line S1. The switching element SW is provided at an intersection between the gate line G1 and source line S1. A drain line of the switching element SW is formed to extend along the source line S1 and storage capacitance line C1, and is electrically connected to the pixel electrode PE via a contact hole CH formed in an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA is located between the source line S1 and source line S2. In the illustrated example, the sub-pixel electrode PB crosses an intermediate portion in the second direction Y of the main pixel electrode PA. Accordingly, the main pixel electrode PA linearly extends in the second direction Y from the intersection with the sub-pixel electrode PB to the vicinity of the upper side end portion of the pixel PX and to the vicinity of the lower side end portion of the pixel PX. In other words, the main pixel electrode PA extends from the intersection with the sub-pixel electrode PB towards the gate line G1 and gate line G2. Specifically, the pixel electrode PE is formed in a cross shape. In addition, the main pixel electrode PA is disposed at a substantially middle position between the source line S1 and source line S2, that is, at a center of the pixel PX. The distance in the first direction X between the source line S1 and the main pixel electrode PA is substantially equal to the distance in the first direction X between the source line S2 and the main pixel electrode PA. The main pixel electrode PA is formed in a strip shape having a substantially equal width in the first direction X.

The sub-pixel electrode PB crosses the main pixel electrode PA and extends along the first direction X. The sub-pixel electrode PB linearly extends in the first direction X from the intersection with the main pixel electrode PA to the vicinity of the left side end portion of the pixel PX and to the vicinity of the right side end portion of the pixel PX. In other words, the sub-pixel electrode PB linearly extends from the intersection with the main pixel electrode PA toward the source line S1 and source line S2. In addition, the sub-pixel electrode PB is disposed at a substantially middle position between the gate line G1 and gate line G2, that is, at the center of the pixel PX. The distance in the second direction Y between the gate line G1 and the sub-pixel electrode PB is substantially equal to the distance in the second direction Y between the gate line G2 and the sub-pixel electrode PB. The sub-pixel electrode PB is formed in a strip shape having a substantially equal width in the second direction Y. Furthermore, the sub-pixel electrode PB is opposed to the storage capacitance line C1. In other words, the storage capacitance line C1 is located under the sub-pixel electrode PB.

Specifically, the entirety of the sub-pixel electrode PB is located in an area overlapping the storage capacitance line C1. The sub-pixel electrode PB is electrically connected to the switching element SW via the contact hole CH. The sub-pixel electrode PB is formed with a greater width than the main pixel electrode PA. In addition, the length of the main pixel electrode PA in the second direction Y is greater than the length of the sub-pixel electrode PB in the first direction X.

The common electrode CE includes main common electrodes CA and sub-common electrodes CB. The main common electrodes CA and sub-common electrodes CB are formed to be integral or continuous with each other, and are electrically to each other. Specifically, the common electrode CE is formed in a grid shape in a manner to surround the pixel.

The main common electrodes CA extend, in the X-Y plane, linearly in the second direction Y that is substantially parallel to the main pixel electrode PA, on both sides of the main pixel electrode PA. Alternatively, the main common electrodes CA are opposed to the source lines S which extend in the second direction Y, and extend substantially in parallel to the main pixel electrode PA. Specifically, the source lines S are located under the main common electrodes CA. The main common electrode CA is formed in a strip shape having a substantially equal width in the first direction X. In the example illustrated, two main common electrodes CA are arranged in parallel with a distance in the first direction X. Specifically, the main common electrodes CA include a main common electrode CAL disposed at the left side end portion of the pixel PX, and a main common electrode CAR disposed at the right side end portion of the pixel PX. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is opposed to the source line S1, and the main common electrode CAR is opposed to the source line S2. The main common electrode CAL and the main common electrode CAR are electrically connected to each other within the active area or outside the active area.

The sub-common electrodes CB extend, in the X-Y plane, linearly in the first direction X that is substantially parallel to the sub-pixel electrode PB, on both sides of the sub-pixel electrode PB. Alternatively, the sub-common electrodes CB are opposed to the gate lines G which extend in the first direction X, and extend substantially in parallel to the sub-pixel electrode PB. Specifically, the gate lines G are located under the sub-common electrodes CB. The sub-common electrode CB is formed in a strip shape having a substantially equal width in the second direction Y. In the example illustrated, two sub-common electrodes CB are arranged in parallel with a distance in the second direction Y. Specifically, the sub-common electrodes CB include a sub-common electrode CBU disposed at the upper side end portion of the pixel PX, and a sub-common electrode CBB disposed at the lower side end portion of the pixel PX. Strictly speaking, the sub-common electrode CBU is disposed to extend over a boundary between the pixel PX and a pixel neighboring on the upper side, and the sub-common electrode CBB is disposed to extend over a boundary between the pixel PX and a pixel neighboring on the lower side. The sub-common electrode CBU is opposed to the gate line G1, and the sub-common electrode CBB is opposed to the gate line G2.

Paying attention to the positional relationship between the pixel electrode PE and the common electrode CE, the common electrode CE does not overlap the pixel electrode PE in the X-Y plane. The main pixel electrode PA and the main common electrodes CA are alternately arranged along the first direction X. One main pixel electrode PA is located between the main common electrode CAL and main common electrode CAR which neighbor each other. In other words, the main common electrode CAL and main common electrode CAR are disposed on both sides of a position immediately above the main pixel electrode PA. Alternatively, the main pixel electrode PA is disposed between the main common electrode CAL and main common electrode CAR. Thus, the main common electrode CAL, main pixel electrode PA and main common electrode CAR are arranged in the named order along the first direction X. The main pixel electrode PA is located at a substantially middle point between the main common electrode CAL and main common electrode CAR. Specifically, the distance between the main common electrode CAL and the main pixel electrode PA in the first direction X is substantially equal to the distance between the main common electrode CAR and the main pixel electrode PA in the first direction X. In the present embodiment, the distance between the main common electrode CA and the main pixel electrode PA in the first direction X, that is, the distance between an edge of the main pixel electrode PA and an edge of the main common electrode CA, which are opposed to each in the X-Y plane, is referred to as "first horizontal inter-electrode distance HD".

In the X-Y plane, the sub-pixel electrode PB and the sub-common electrodes CB are alternately arranged along the second direction Y. One sub-pixel electrode PB is located between the sub-common electrode CBU and sub-common electrode CBB which neighbor each other. In other words, the sub-common electrode CBU and sub-common electrode CBB are disposed on both sides of a position immediately above the sub-pixel electrode PB. Alternatively, the sub-pixel electrode PB is disposed between the sub-common electrode CBU and sub-common electrode CBB. Thus, the sub-common electrode CBB, sub-pixel electrode PB and sub-common electrode CBU are arranged in the named order along the second direction Y. The sub-pixel electrode PB is located at a substantially middle point between the sub-common electrode CBU and sub-common electrode CBB. Specifically, the distance between the sub-common electrode CBU and the sub-pixel electrode PB in the second direction Y is substantially equal to the distance between the sub-common electrode CBB and the sub-pixel electrode PB in the second direction Y. In the present embodiment, the distance between the sub-common electrode CB and the sub-pixel electrode PB in the second direction Y, that is, the distance between an edge of the sub-pixel electrode PB and an edge of the sub-common electrode CB, which are opposed to each in the X-Y plane, is referred to as "second horizontal inter-electrode distance YD".

The first horizontal inter-electrode distance HD is less than the second horizontal inter-electrode distance YD. The second horizontal inter-electrode distance YD is double or more greater than the first horizontal inter-electrode distance HD. Since the length of the pixel PX in the second direction Y is about three times the length of the pixel PX in the first direction X, the second horizontal inter-electrode distance YD is about three times the first horizontal inter-electrode distance HD.

FIG. 3 is a schematic cross-sectional view, taken along line A-A in FIG. 2, showing a cross-sectional structure of the liquid crystal display panel LPN shown in FIG. 2. FIG. 3 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. Source lines S are formed on a first interlayer insulation film 11, and are covered with a second interlayer insulation film 12. Gate lines and storage capacitance lines, which are not shown, are disposed, for example, between the first insulative substrate 10 and the first interlayer insulation film 11. Pixel electrodes PE are formed on the second interlayer insulation film 12. Each pixel electrode PE is located on the inside of a position immediately above each of neighboring source lines S. A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed over the second interlayer insulation film 12. The first alignment film AL1 is formed of a material which exhibits horizontal alignment properties. In the meantime, the array substrate AR may include a part of the common electrode CE.

The counter-substrate CT is formed by using a second insulative substrate 20 having light transmissivity. The counter-substrate CT includes a black matrix BM, a color filter CF, an overcoat layer OC, a common electrode CE, and a second alignment film AL2.

The black matrix BM partitions the pixels PX and forms aperture portions AP which are opposed to the pixel electrodes PE. Specifically, the black matrix BM is disposed so as to be opposed to wiring portions, such as the source lines S, gate lines, storage capacitance lines, and switching elements. In this example, only those portions of the black matrix BM, which extend in the second direction Y, are depicted, but the black matrix BM may include portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions overlapping the black matrix BM. The overcoat layer OC covers the color filters CF. The overcoat layer OC reduces the effect of asperities on the surface of the color filters CF. The overcoat layer OC is formed of, for example, a transparent resin material.

The common electrode CE is formed on that side of the overcoat layer OC, which is opposed to the array substrate AR. The main common electrodes CA are located above the source line S. The second alignment film AL2 is disposed on that surface of the counter-substrate CT, which is opposed to the array substrate AR, and the second alignment film AL2 extends over substantially the entirety of the active area ACT. The second alignment film AL2 covers the common electrodes CE and overcoat layer OC. The second alignment film AL2 is formed of a material which exhibits horizontal alignment properties.

The distance between the common electrodes CE and the pixel electrodes PE in a third direction Z is substantially constant. The third direction Z corresponds to a direction which is perpendicular to the first direction X and second direction Y, or corresponds to a normal direction of the liquid crystal display panel LPN. In the present embodiment, a distance between the common electrode CE and the pixel electrode PE in the third direction Z, that is, a distance in the third direction Z between a surface of the pixel electrode PE and a surface of the common electrode CE, which are opposed to each other in the X-Z plane, is referred to as "vertical inter-electrode distance VD". The first horizontal inter-electrode distance HD between the pixel electrode PE and the common electrode CE is greater than the vertical inter-electrode distance VD between the pixel electrode PE and the common electrode CE.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 2, the first alignment treatment direction PD1 and second alignment treatment direction PD2 are parallel to each other and are identical. In an example shown in part (B) of FIG. 2, the first alignment treatment direction PD1 and second alignment treatment direction PD2 are parallel to each other and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant SB on the outside of the active area ACT in the state in which the predetermined cell gap is created therebetween. The cell gap, in this context, is substantially equivalent to the above-described vertical inter-electrode distance VD.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached, by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached, by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to an initial alignment direction of liquid crystal molecules LM, that is, the first alignment treatment direction PD1 or second alignment treatment direction PD2. When the initial alignment direction is parallel to the second direction Y, the polarization axis of one polarizer is parallel to the second direction Y or is parallel to the first direction X.

In an example shown in part (a) of FIG. 2, the first polarizer PL1 is disposed such that the first polarization axis AX1 thereof is perpendicular to the second direction Y that is the initial alignment direction of liquid crystal molecules LM, and the second polarizer PL2 is disposed such that the second polarization axis AX2 thereof is parallel to the initial alignment direction of liquid crystal molecules LM. In addition, in an example shown in part (b) of FIG. 2, the second polarizer PL2 is disposed such that the second polarization axis AX2 thereof is perpendicular to the second direction Y that is the initial alignment direction of liquid crystal molecules LM, and the first polarizer PL1 is disposed such that the first polarization axis AX1 thereof is parallel to the initial alignment direction of liquid crystal molecules LM.

Next, the operation of the liquid crystal display panel LPN having the above-described structure is described with reference to FIG. 2 and FIG. 3.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 2. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 2, the liquid crystal molecule LM in a lower half part of the region between the pixel electrode PE and main common electrode CAL rotates clockwise relative to the second direction Y, and is aligned in a lower left direction in the Figure. The liquid crystal molecule LM in an upper half part of the region between the pixel electrode PE and main common electrode CAL rotates counterclockwise relative to the second direction Y, and is aligned in an upper left direction in the Figure. The liquid crystal molecule LM in a lower half part of the region between the pixel electrode PE and main common electrode CAR rotates counterclockwise relative to the second direction Y, and is aligned in a lower right direction in the Figure. The liquid crystal molecule LM in an upper half part of the region between the pixel electrode PE and main common electrode CAR rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, linearly polarized light perpendicular to the first polarization axis AX1 of the first polarizer PL1 enters the liquid crystal display panel LPN, and the polarization state of the light varies depending on the alignment state of the liquid crystal molecules LM when the light passes through the liquid crystal layer LQ. At the ON time, at least part of the light emerging from the liquid crystal layer LQ passes through the second polarizer PL2 (white display).

Figure 4:
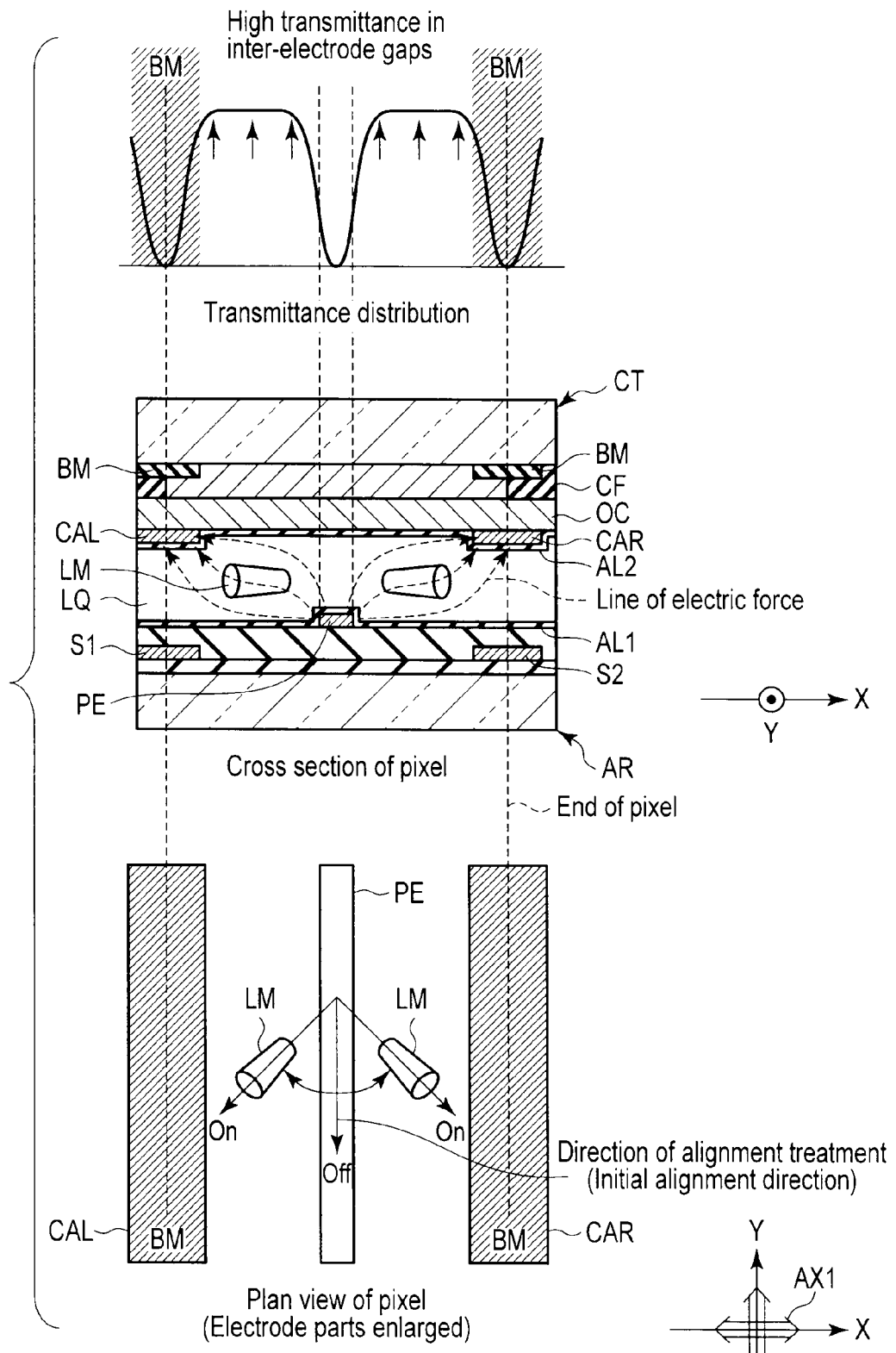
FIG. 4 is a view for explaining an electric field which is produced between a pixel electrode and a common electrode in the liquid crystal display panel shown in FIG. 2, and a relationship between directors of liquid crystal molecules by this electric field and a transmittance.

FIG. 4 is a view for explaining an electric field which is produced between the pixel electrode PE and common electrode CE in the liquid crystal display panel LPN shown in FIG. 2, and a relationship between directors of liquid crystal molecules LM by this electric field and a transmittance.

In the OFF state, the liquid crystal molecules LM are initially aligned in a direction which is substantially parallel to the second direction Y. In the ON state in which a potential difference is produced between the pixel electrode PE and the common electrode CE, when the director of the liquid crystal molecule LM (or the major-axis direction of the liquid crystal molecule LM) deviates by about 45° from the first polarization axis AX1 of the first polarizer PL1 and from the second polarization axis AX2 of the second polarizer PL2 in the X-Y plane, the optical modulation ratio of the liquid crystal layer LQ is highest (i.e. the transmittance at the aperture portion is highest).

In the example illustrated, in the ON state, the director of the liquid crystal molecule LM between the main common electrode CAL and the pixel electrode PE is substantially parallel to a 45°-225° azimuth direction in the X-Y plane, and the director of the liquid crystal molecule LM between the main common electrode CAR and the pixel electrode PE is substantially parallel to a 135°-315° azimuth direction in the X-Y plane, and a peak transmittance is obtained. Meanwhile, when the director of the liquid crystal molecule LM is substantially parallel to a 0°-180° azimuth direction in the X-Y plane or substantially parallel to a 90°-270° azimuth direction in the X-Y plane, the transmittance at the aperture portion becomes lowest.

In the ON state, if attention is paid to the transmittance distribution per pixel, the liquid crystal molecules LM over the pixel electrode PE and common electrode CE hardly rotate from the initial alignment direction. In other words, the directors of the liquid crystal molecules LM over the pixel electrode PE and common electrode CE are substantially parallel to the 90°-270° azimuth direction. Thus, the transmittance over the pixel electrode PE and common electrode CE is substantially zero. On the other hand, a high transmittance can be obtained over almost the entire area of the inter-electrode gaps between the pixel electrode PE and the common electrode CE.

Each of the main common electrode CAL that is located immediately above the source line S1 and the main common electrode CAR that is located immediately above the source line S2 is opposed to the black matrix BM. Each of the main common electrode CAL and main common electrode CAR has a width which is equal to or less than the width of the black matrix BM in the first direction X, and does not extend toward the pixel electrode PE from the position overlapping the black matrix BM. Thus, the aperture portion in each pixel, which contributes to display, corresponds to regions between the pixel electrode PE and main common electrode CAL and between the pixel electrode PE and main common electrode CAR, these regions being included in the region between the black matrixes BM or the region between the source line S1 and source line S2.

In the present embodiment, the first horizontal inter-electrode distance HD between the pixel electrode PE and the common electrode CE is greater than the vertical inter-electrode distance VD between the pixel electrode PE and the common electrode CE. Thus, a high transmittance can be obtained at the aperture portion. This will be described below more concretely.

Figure 5:
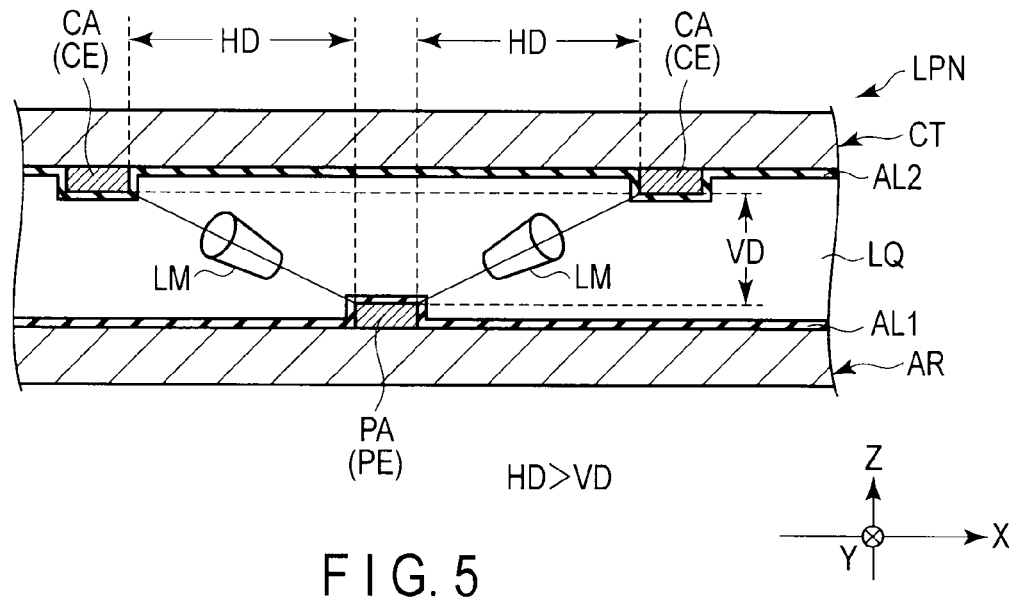
FIG. 5 is a schematic cross-sectional view of the liquid crystal display panel, for explaining alignment states of liquid crystal molecules included in the liquid crystal layer in the embodiment.

FIG. 5 is a schematic cross-sectional view of the liquid crystal display panel LPN, for explaining alignment states of liquid crystal molecules LM included in the liquid crystal layer LQ in the embodiment. FIG. 5 corresponds to a cross section of the liquid crystal display panel LPN along the first direction X, and shows only the structure that is necessary for the description. The example illustrated corresponds to the case in which the first horizontal inter-electrode distance HD between the main pixel electrode PA and the main common electrode CA in the first direction X is greater than the vertical inter-electrode distance VD between the main pixel electrode PA and the main common electrode CA in the third direction Z.

At the ON time, an electric field is produced between the main pixel electrode PA and the main common electrode CA. In the region between the main pixel electrode PA and the main common electrode CA, the alignment of the liquid crystal molecules LM is controlled by this electric field. At this time, the liquid crystal molecules LM maintain an alignment state which is relatively parallel to the X-Y plane. The liquid crystal layer LQ including the liquid crystal molecules LM in this alignment state has a retardation $\Delta n \cdot d$ which is necessary for modulating passing light ($\Delta n$ is refractive index anisotropy, and d is the thickness of liquid crystal layer LQ). Specifically, linearly polarized light, which has passed through the first optical element OD1, is modulated into such a polarization state as to be able to pass through the second optical element OD2, while the linearly polarized light is passing through the liquid crystal layer LQ. Thus, the light, which has passed through the liquid crystal layer LQ between the main pixel electrode PA and main common electrode CA, passes through the second optical element OD2 and contributes to display. Thereby, a desired transmittance can be obtained.

Figure 6:
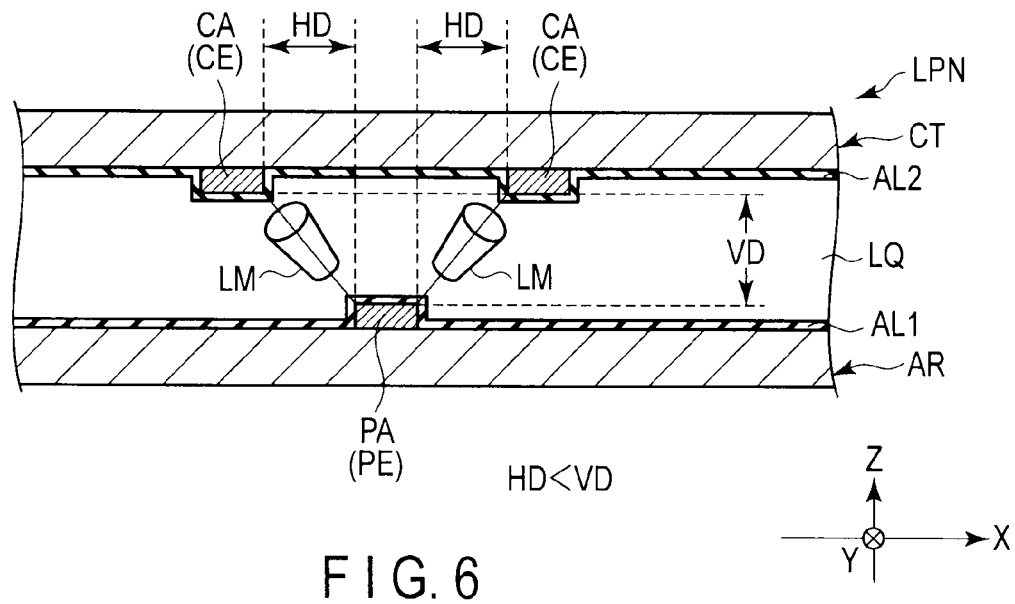
FIG. 6 is a schematic cross-sectional view of a liquid crystal display panel, for explaining alignment states of liquid crystal molecules included in a liquid crystal layer in a comparative example.

FIG. 6 is a schematic cross-sectional view of a liquid crystal display panel LPN according to a comparative example, for explaining alignment states of liquid crystal molecules LM included in a liquid crystal layer LQ. The example illustrated corresponds to the case in which the vertical inter-electrode distance VD between the main pixel electrode PA and the main common electrode CA in the third direction Z is greater than the first horizontal inter-electrode distance HD between the main pixel electrode PA and the main common electrode CA in the first direction X.

At the ON time, an electric field is produced between the main pixel electrode PA and the main common electrode CA. The alignment of the liquid crystal molecules LM in the region between these electrodes is controlled by the produced electric field. At this time, the liquid crystal molecules LM transition into such an alignment state that the liquid crystal molecules LM are raised relative to the X-Y plane. With the liquid crystal layer LQ including the liquid crystal molecules LM in this alignment state, it is difficult to obtain a retardation enough to modulate passing light. Consequently, compared to the example shown in FIG. 5, the ratio of the light, which passes through the second optical element OD2, to the light, which has passed through the liquid crystal layer LQ between the main pixel electrode PA and the main common electrode CA, decreases, resulting in a decrease in transmittance.

In order to confirm this phenomenon, the inventor prepared a liquid crystal display device corresponding to the present embodiment shown in FIG. 5 and a liquid crystal display device corresponding to the comparative example shown in FIG. 6. The transmittance in each device was measured in the ON state with the same voltage applied. In the liquid crystal display device corresponding to the present embodiment, the inter-electrode distance between the main pixel electrode PA and the main common electrode CA was set such that the first horizontal inter-electrode distance HD is 10 µm and the vertical inter-electrode distance VD is 4 µm. In the liquid crystal display device corresponding to the comparative example, the inter-electrode distance between the main pixel electrode PA and the main common electrode CA was set such that the first horizontal inter-electrode distance HD is 2.5 μm and the vertical inter-electrode distance VD is 4 μm. The other conditions were the same. When the transmittance in the liquid crystal display device corresponding to the comparative example was set at 1, the transmittance of 1.54 was obtained in the liquid crystal display device corresponding to the present embodiment.

According to the present embodiment, as regards the inter-electrode distance between the main pixel electrode PA of the pixel electrode PE, which is provided on the array substrate AR, and the main common electrode CA of the common electrode CE which is provided on the counter-substrate CT, the first horizontal inter-electrode distance HD is greater than the vertical inter-electrode distance VD. Thus, the raising of the liquid crystal molecules LM at the ON time can be suppressed, and the retardation enough to modulate light passing through the liquid crystal layer LQ can be obtained. Accordingly, a decrease in transmittance can be suppressed. Thereby, the degradation in display quality can be suppressed.

In addition, according to the present embodiment, the second horizontal inter-electrode distance YD is greater than the first horizontal inter-electrode distance HD. Thus, the electric field along the first direction X between the main pixel electrode PA and main common electrode CA mainly acts on the liquid crystal molecules LM, and the electric field along the second direction Y between the sub-pixel electrode PB and sub-common electrode CB hardly acts on the liquid crystal molecules LM. Specifically, in each pixel, an electric field along the first direction X is mainly produced between the pixel electrode PE and the common electrode CE, and the liquid crystal molecules LM are switched by the electric field along the first direction X. Therefore, disturbance in alignment of liquid crystal molecules hardly occurs in the pixel, and a desired display quality can be obtained.

Moreover, according to the present embodiment, a high transmittance can be obtained in the inter-electrode gap between the pixel electrode PE and the common electrode CE. Thus, a transmittance per pixel can sufficiently be increased by increasing the inter-electrode distance between the main pixel electrode and the main common electrode. As regards product specifications in which the pixel pitch is different, the peak condition of the transmittance distribution, as shown in FIG. 4, can be used by varying the inter-electrode distance. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, as shown in FIG. 4, if attention is paid to the transmission distribution in the region overlapping the black matrix BM, the transmittance is sufficiently lowered. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, when the main common electrode CAL and main common electrode CAR are disposed immediately above the source line S1 and source line S2, respectively, the aperture portion AP can be increased and the transmittance of the pixel PX can be improved, compared to the case in which the main common electrode CAL and main common electrode CAR are disposed on the pixel electrode PE side of the source line S1 and source line S2.

Furthermore, by disposing the main common electrode CAL and main common electrode CAR immediately above the source line S1 and source line S2, respectively, the inter-electrode distance between the pixel electrode PE, on one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 2. An angle θ1 formed between the second direction Y and the initial alignment direction D is 0° or more and 45° or less. From the standpoint of alignment control of liquid crystal molecules LM, it is desirable that the initial alignment direction of liquid crystal molecules LM be a direction in a range of 0° or more and 20° or less, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is revered, it is desirable that the above-described formed angle θ1 be within the range of 45° or more and 90° or less, preferably the range of 70° or more and 90° or less.

Since a lateral electric field is hardly produced over the pixel electrode PE or common electrode CE even at the ON time (or an electric field enough to drive liquid crystal molecules LM is not produced), the liquid crystal molecules scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent material, and may be formed of an opaque wiring material such as aluminum, silver or copper.

In the above-described example, the structure, in which the storage capacitance line is disposed immediately below the sub-pixel electrode PB, has been described. However, the gate line may be disposed immediately below the sub-pixel electrode PB.

In the present embodiment, the structure of the pixel PX is not limited to the example shown in FIG. 2.

FIG. 7 is a plan view which schematically shows another structure example at a time when the array substrate AR is viewed from the counter-substrate side.

This structure example differs from the structure example shown in FIG. 2 in that the array substrate AR includes a first shield electrode SE1 and a second shield electrode SE2.

The first shield electrode SE1 is electrically connected to the common electrode CE and is set at the same potential as the common electrode CE. The first shield electrode SE1 extends in the first direction X, and is opposed to each of the gate lines G. In the example illustrated, two first shield electrodes SE1 are arranged in parallel with a distance in the second direction Y.

The second shield electrode SE2 is continuous with the first shield electrode SE1, and is set at the same potential as the common electrode CE. In addition, the second shield electrode SE2 extends in the second direction Y, and is opposed to each of the source lines S. In the example illustrated, two second shield electrodes SE2 are arranged in parallel with a distance in the first direction X.

The first shield electrodes SE1 and second shield electrodes SE2 are formed in the same layer as the pixel electrode PE, and can be formed of the same material as the pixel electrode PE. Specifically, when the pixel electrode PE is formed on the second interlayer insulation film 12 in the example shown in FIG. 3, the first shield electrodes SE1 and second shield electrodes SE2 are formed on the second interlayer insulation film 12 and are covered with the first alignment film AL1. The first shield electrodes SE1 and second shield electrodes SE2 are spaced apart from the pixel electrode PE. The array substrate AR of this structure example is combined with the counter-substrate CT including the common electrode CE shown in FIG. 2.

Figure 8:
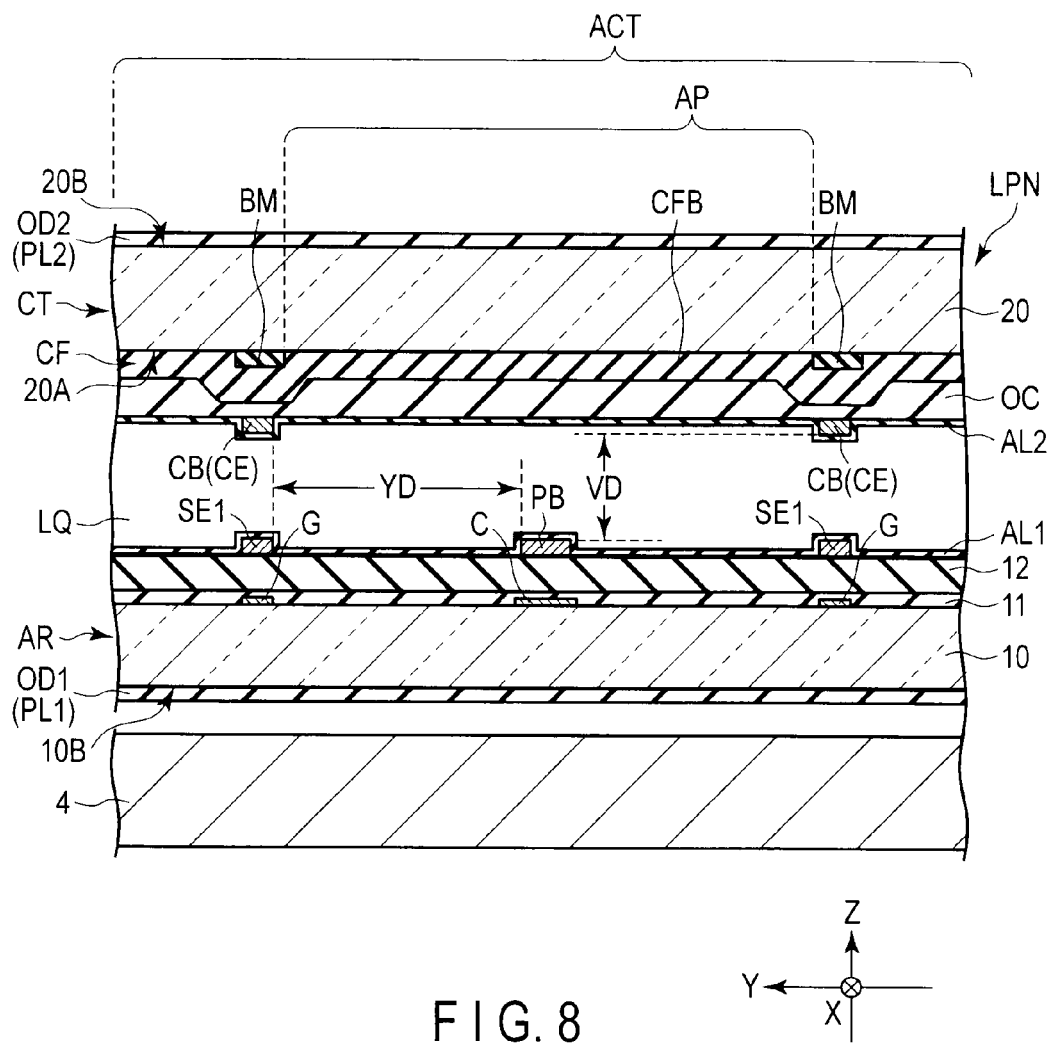
FIG. 8 is a schematic cross-sectional view, taken along line B-B in FIG. 7, showing a cross-sectional structure of a liquid crystal display panel which is combined with the array substrate shown in FIG. 7.

FIG. 8 is a schematic cross-sectional view, taken along line B-B in FIG. 7, showing a cross-sectional structure of a liquid crystal display panel which is combined with the array substrate AR shown in FIG. 7. FIG. 8 shows only parts which are necessary for the description.

The gate line G is located under the first shield electrode SE1 or under the sub-common electrode CB. The sub-common electrode PB is opposed to the first shield electrode SE1. The horizontal inter-electrode distance in the second direction Y between the sub-pixel electrode PB and the sub-common electrode CB is equal to the horizontal inter-electrode distance in the second direction Y between the first shield electrode SE1 and the sub-common electrode CB. Specifically, in the structure example illustrated, the second horizontal inter-electrode distance YD corresponds to the inter-electrode distance in the second direction Y between the sub-pixel electrode PB and each of the sub-common electrode CB and the first shield electrode SE1. In this structure example, too, the first horizontal inter-electrode distance HD is less than the second horizontal inter-electrode distance YD, and is greater than the vertical inter-electrode distance VD.

According to the structure example shown in FIG. 7 and FIG. 8, the same advantageous effects as with the structure example shown in FIG. 2, etc. can be obtained. In addition, with the provision of the first shield electrodes SE1, an undesired electric field from the gate lines G can be shielded. Therefore, the degradation in display quality can be further suppressed. Moreover, with the provision of the second shield electrodes SE2, an undesired electric field from the source lines S can be shielded. Therefore, the degradation in display quality can be further suppressed.

Figure 9:
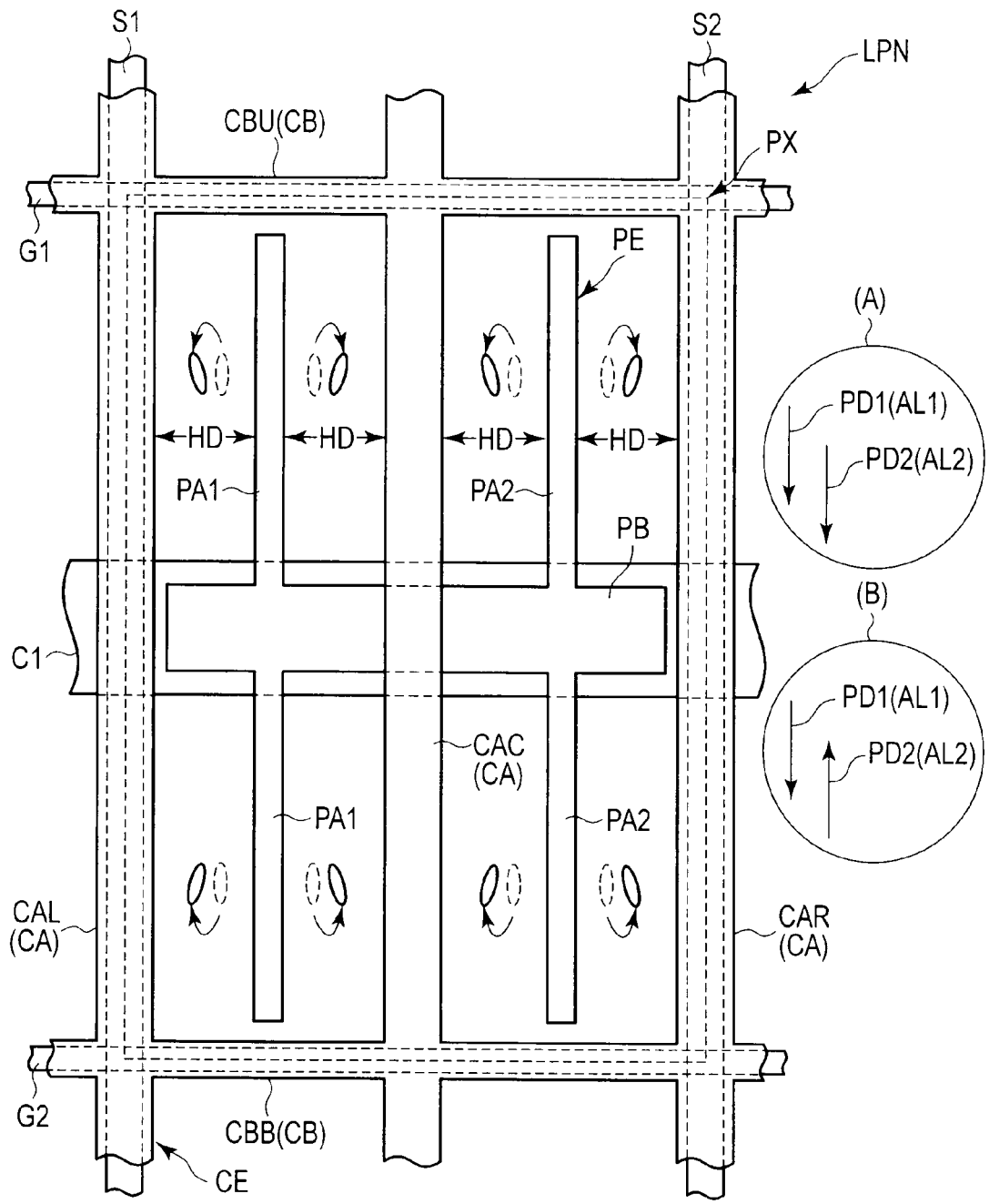
FIG. 9 is a plan view which schematically shows another structure example of the pixel at a time when the liquid crystal display panel shown in FIG. 1 is viewed from the counter-substrate side.

FIG. 9 is a plan view which schematically shows another structure example of the pixel PX at a time when the liquid crystal display panel LPN shown in FIG. 1 is viewed from the counter-substrate side.

This structure example differs from the structure example shown in FIG. 7 in that the pixel electrode PE includes a plurality of main pixel electrodes PA which are arranged substantially in parallel with an interval in the first direction X, and that the common electrode CE includes a main common electrode CA between the neighboring main pixel electrodes PA, in addition to the main common electrode CE being formed in a grid shape in a manner to surround the pixel PX.

Specifically, the pixel electrode PE includes a main pixel electrode PA1, a main pixel electrode PA2 and a sub-pixel electrode PB. The main pixel electrode PA1, main pixel electrode PA2 and sub-pixel electrode PB are mutually electrically connected. The main pixel electrode PA1 and main pixel electrode PA2 are arranged substantially in parallel with an interval in the first direction X. The main pixel electrode PA1 and main pixel electrode PA2 linearly extend in the second direction Y from the sub-pixel electrode PB to the vicinity of the upper side end portion of the pixel PX and to the vicinity of the lower side end portion of the pixel PX. The sub-pixel electrode PB extends along the first direction X. The sub-pixel electrode PB is located in an area overlapping the storage capacitance line C1, and is electrically connected to the switching element SW via the contact hole CH.

The common electrode CE includes a main common electrode CAL, a main common electrode CAR, a main common electrode CAC, a sub-common electrode CBB and a sub-common electrode CBU. The main common electrode CAL, main common electrode CAR, main common electrode CAC, sub-common electrode CBB and sub-common electrode CBU are mutually electrically connected.

The main common electrode CAL, main common electrode CAR and main common electrode CAC are arranged substantially in parallel with intervals in the first direction X, and extend in the second direction Y. In the pixel PX, the main common electrode CAL is located on the left side end portion, the main common electrode CAR is located on the right side end portion, and the main common electrode CAC is located between the main pixel electrode PA1 and main pixel electrode PA2.

The sub-common electrode CBB and sub-common electrode CBU are arranged substantially in parallel with an interval in the second direction Y, and extend in the first direction X. In the pixel PX, the sub-common electrode CBB is disposed at the lower side end portion, and the sub-common electrode CBU disposed at the upper side end portion. The sub-pixel electrode PB is disposed between the sub-common electrode CBB and the sub-common electrode CBU.

Paying attention to the positional relationship between the pixel electrode PE and the common electrode CE, the main pixel electrodes PA and the main common electrodes CA are alternately arranged along the first direction X, and the sub-pixel electrode PB and the sub-common electrodes CB are alternately arranged along the second direction Y. Specifically, one main pixel electrode PA1 is located between the main common electrode CAL and main common electrode CAC which neighbor each other, and one main pixel electrode PA2 is located between the main common electrode CAC and main common electrode CAR which neighbor each other. The main common electrode CAL, main pixel electrode PA1, main common electrode CAC, main pixel electrode PA2 and main common electrode CAR are arranged in the named order along the first direction X. In addition, one sub-pixel electrode PB is located between the sub-common electrode CBB and sub-common electrode CBU which neighbor each other, and the sub-common electrode CBB, sub-pixel electrode PB and sub-common electrode CBU are arranged in the named order along the second direction Y.

The first horizontal inter-electrode distance between the main common electrode CAL and main pixel electrode PA1, the first horizontal inter-electrode distance between the main common electrode CAC and main pixel electrode PA1, the first horizontal inter-electrode distance between the main common electrode CAC and main pixel electrode PA2, and the first horizontal inter-electrode distance between the main common electrode CAR and main pixel electrode PA2 are substantially equal (HD).

In this structure example, too, the liquid crystal molecules LM, which are initially aligned in the second direction Y at the OFF time, can form many domains in each pixel PX in the state in which an electric field is produced between the pixel electrode PE and common electrode CE at the ON time, and the viewing angel can be increased.

As has been described above, according to the present embodiments, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a cross-shaped pixel electrode which is disposed in a pixel having a less length in a first direction than in a second direction crossing the first direction and includes a main pixel electrode extending in the second direction and a sub-pixel electrode extending in the first direction, the first substrate further including a first alignment film which covers the pixel electrode and is subjected to alignment treatment in a first alignment treatment direction;
a second substrate including a common electrode which includes main common electrodes extending in the second direction on both sides of the main pixel electrode and sub-common electrodes extending in the first direction on both sides of the sub-pixel electrode, the second substrate further including a second alignment film which covers the common electrode and is subjected to alignment treatment in a second alignment treatment direction which is parallel to the first alignment treatment direction; and
a liquid crystal layer including liquid crystal molecules held between the first substrate and the second substrate, wherein a first horizontal inter-electrode distance in the first direction between the main pixel electrode and the main common electrode is less than a second horizontal inter-electrode distance in the second direction between the sub-pixel electrode and the sub-common electrode and is greater than a vertical inter-electrode distance between the main pixel electrode and the main common electrode in a third direction which is perpendicular to the first direction and the second direction.

2. The liquid crystal display device of claim 1, wherein the second horizontal inter-electrode distance is double or more greater than the first horizontal inter-electrode distance.

3. The liquid crystal display device of claim 2, wherein the second horizontal inter-electrode distance is about three times the first horizontal inter-electrode distance.

4. The liquid crystal display device of claim 3, wherein a length of the main pixel electrode in the second direction is greater than a length of the sub-pixel electrode in the first direction.

5. The liquid crystal display device of claim 4, wherein an initial alignment direction of the liquid crystal molecules in a state, in which an electric field is not produced between the pixel electrode and the common electrode, is substantially parallel to a direction of extension of the main pixel electrode.

6. The liquid crystal display device of claim 5, wherein the first alignment treatment direction is identical to the second alignment treatment direction, and
the liquid crystal molecules are splay-aligned between the first substrate and the second substrate.

7. The liquid crystal display device of claim 6, further comprising a first polarizer which is disposed on an outer surface of the first substrate and includes a first polarization axis, and a second polarizer which is disposed on an outer surface of the second substrate and includes a second polarization axis having a positional relationship of crossed Nicols with the first polarization axis, the first polarization axis being perpendicular or parallel to the initial alignment direction.

8. The liquid crystal display device of claim 4, wherein the first substrate further includes gate lines extending in the first direction and located under the sub-common electrodes, a storage capacitance line extending in the first direction and located under the sub-pixel electrode, source lines extending in the second direction and located under the main common electrodes, and first shield electrodes having the same potential as the common electrode, extending in the first direction, opposed to the gate lines, and covered with the first alignment film, and
an inter-electrode distance in the second direction between the sub-pixel electrode and the first shield electrode is equal to the second horizontal inter-electrode distance.

9. The liquid crystal display device of claim 6, wherein the first substrate further includes second shield electrodes having the same potential as the common electrode, extending in the second direction, opposed to the source lines, and covered with the first alignment film.

10. A liquid crystal display device comprising:
a first substrate including a cross-shaped pixel electrode which includes a sub-pixel electrode extending a first direction and a main pixel electrode extending in a second direction crossing the first direction, the main pixel electrode having a greater length than the sub-pixel electrode, the first substrate further including a first alignment film which covers the pixel electrode and is subjected to alignment treatment in a first alignment treatment direction;

a second substrate including a common electrode which includes main common electrodes extending in the second direction on both sides of the main pixel electrode and sub-common electrodes extending in the first direction on both sides of the sub-pixel electrode, the second substrate further including a second alignment film which covers the common electrode and is subjected to alignment treatment in a second alignment treatment direction which is parallel and identical to the first alignment treatment direction; and a liquid crystal layer including liquid crystal molecules held between the first substrate and the second substrate, wherein an initial alignment direction of the liquid crystal molecules in a state, in which an electric field is not produced between the pixel electrode and the common electrode, is substantially parallel to a direction of extension of the main pixel electrode, and a first horizontal inter-electrode distance in the first direction between the main pixel electrode and the main common electrode is less than a second horizontal inter-electrode distance in the second direction between the sub-pixel electrode and the sub-common electrode and is greater than a vertical inter-electrode distance between the main pixel electrode and the main common electrode in a third direction which is perpendicular to the first direction and the second direction.

11. The liquid crystal display device of claim 10, wherein the second horizontal inter-electrode distance is double or more greater than the first horizontal inter-electrode distance.

12. The liquid crystal display device of claim 11, wherein the second horizontal inter-electrode distance is about three times the first horizontal inter-electrode distance.

13. The liquid crystal display device of claim 12, further comprising a first polarizer which is disposed on an outer surface of the first substrate and includes a first polarization axis, and a second polarizer which is disposed on an outer surface of the second substrate and includes a second polarization axis having a positional relationship of crossed Nicols with the first polarization axis, the first polarization axis being perpendicular or parallel to the initial alignment direction.

* * * * *